US012520963B2

(12) United States Patent
Diskin et al.

(10) Patent No.: US 12,520,963 B2
(45) Date of Patent: Jan. 13, 2026

(54) HANDHELD FILTER PRESS

(71) Applicant: Helen of Troy Limited, St. Michael (BB)

(72) Inventors: Christopher Diskin, New York, NY (US); Brandon Rodriguez, Brooklyn, NY (US); Nicolas Ernesto Fong, Brooklyn, NY (US)

(73) Assignee: KAZ EUROPE SÀRL, Bussigny (CH)

( * ) Notice: Subject to any disclaimer, the term of this patent is extended or adjusted under 35 U.S.C. 154(b) by 714 days.

(21) Appl. No.: 17/968,012

(22) Filed: Oct. 18, 2022

(65) Prior Publication Data

US 2024/0122395 A1 Apr. 18, 2024

(51) Int. Cl.
*A47J 31/32* (2006.01)
*A47J 31/00* (2006.01)
*A47J 31/38* (2006.01)

(52) U.S. Cl.
CPC ............. *A47J 31/32* (2013.01); *A47J 31/005* (2013.01); *A47J 31/38* (2013.01)

(58) Field of Classification Search
CPC .......... A47J 31/005; A47J 31/32; A47J 31/36; A47J 31/38
See application file for complete search history.

(56) References Cited

U.S. PATENT DOCUMENTS

| 4,763,566 | A | * | 8/1988 | Paoletti | .................. | A47J 31/38 |
| | | | | | | D7/312 |
| 7,849,784 | B2 | | 12/2010 | Adler | | |
| 8,578,839 | B2 | | 11/2013 | Nielsen | | |
| 9,510,705 | B2 | * | 12/2016 | Rolfes | ..................... | A47J 31/38 |
| 10,470,602 | B2 | | 11/2019 | Geissler | | |
| 11,497,343 | B2 | * | 11/2022 | Kuempel | ............ | A47J 31/0605 |
| 2014/0170280 | A1 | | 6/2014 | St. Germain | | |
| 2014/0356501 | A1 | * | 12/2014 | Juris | ...................... | A23F 5/265 |
| | | | | | | 426/433 |
| 2017/0303712 | A1 | | 10/2017 | Pisarevsky | | |

(Continued)

FOREIGN PATENT DOCUMENTS

| CN | 103654412 A | * | 3/2014 | ............ A47J 31/407 |
| CN | 108720600 | | 11/2018 | |

(Continued)

*Primary Examiner* — Reginald Alexander
(74) *Attorney, Agent, or Firm* — RANKIN, HILL & CLARK LLP

(57) ABSTRACT

A handheld filter press includes a pump, a water chamber, and a portafilter basket. The pump includes a pump housing that defines a pump chamber configured to pressurize air, and defines a pump outlet for exhausting pressurized air. The pump includes an outlet valve fluidly connected with the pump outlet. The outlet valve allows air to exit the pump chamber and prevents air from entering the pump chamber through the pump outlet. The water chamber is fluidly connected with the pump chamber through the outlet valve for receiving pressurized air from the pump chamber. The water chamber defines a water chamber outlet for exhausting pressurized air and water from the water chamber. The portafilter basket is fluidly connected with the water chamber for receiving pressurized water from the water chamber through the water chamber outlet. The portafilter basket is configured to store grounds, and to express a brewed beverage.

20 Claims, 5 Drawing Sheets

(56) References Cited

U.S. PATENT DOCUMENTS

| | | |
|---|---|---|
| 2019/0335936 A1 | 11/2019 | Pranckun |
| 2020/0060463 A1 | 2/2020 | Gardiner |
| 2020/0268196 A1 | 8/2020 | Granzeier |
| 2021/0076699 A1 | 3/2021 | Gorin |
| 2021/0076871 A1 | 3/2021 | Gorin |
| 2023/0200581 A1* | 6/2023 | Cheung .................. A47G 19/14 99/279 |
| 2023/0240465 A1* | 8/2023 | Yan ........................ A47J 31/06 99/275 |

FOREIGN PATENT DOCUMENTS

| | | | |
|---|---|---|---|
| CN | 215583862 U * | 1/2022 | .............. A47J 31/32 |
| WO | 2018194355 | 10/2018 | |
| WO | 2020/254808 | 12/2020 | |

\* cited by examiner

HANDHELD FILTER PRESS

BACKGROUND

Manual handheld beverage makers provide users mobile means for preparing a desired beverage without requiring an electric power input. However, some beverage recipes, such as espresso recipes, call for brewing the desired beverage under an elevated pressure conventionally provided by an electric pump that is too cumbersome and immobile for reasonable incorporation into a handheld device. As such, there is interest in a manual handheld beverage maker capable of brewing a beverage, such as espresso, under elevated pressures. Further, there is an interest in arranging such a manual handheld beverage maker to have ergonomic design features for gripping and operating the beverage maker, including operating the beverage maker on a table or other flat surface.

SUMMARY

A handheld filter press includes a pump, a water chamber, and a portafilter basket. The pump includes a pump housing that defines a pump chamber configured to pressurize air, and defines a pump outlet for exhausting pressurized air from the pump chamber. The pump includes an outlet valve fluidly connected with the pump outlet. The outlet valve allows air to exit the pump chamber and prevents air from entering the pump chamber through the pump outlet. The water chamber is fluidly connected with the pump chamber through the outlet valve for receiving pressurized air from the pump chamber. The water chamber defines a water chamber outlet for exhausting pressurized air and water from the water chamber. The portafilter basket is fluidly connected with the water chamber for receiving pressurized water from the water chamber through the water chamber outlet. The portafilter basket is configured to store grounds, and to express a brewed beverage.

A handheld filter press includes a pump, a water chamber, and a portafilter basket. The pump includes a pump housing. The pump housing defines a pump chamber extended along a pump axis and configured to pressurize air, and the pump housing defines a pump outlet for exhausting pressurized air from the pump chamber. The water chamber is removably fixed with the pump housing. The water chamber is fluidly connected with the pump chamber through the pump outlet, and configured to store air and water above atmospheric pressure when fixed with the pump housing. The portafilter basket is removably fixed with the water chamber at an end of the water chamber opposite the pump such that the pump, the water chamber, and the portafilter basket are aligned with each other on the pump axis. The portafilter basket is fluidly connected with the water chamber, configured to store grounds, and configured to express a brewed beverage.

DETAILED DESCRIPTION

Figure 1:
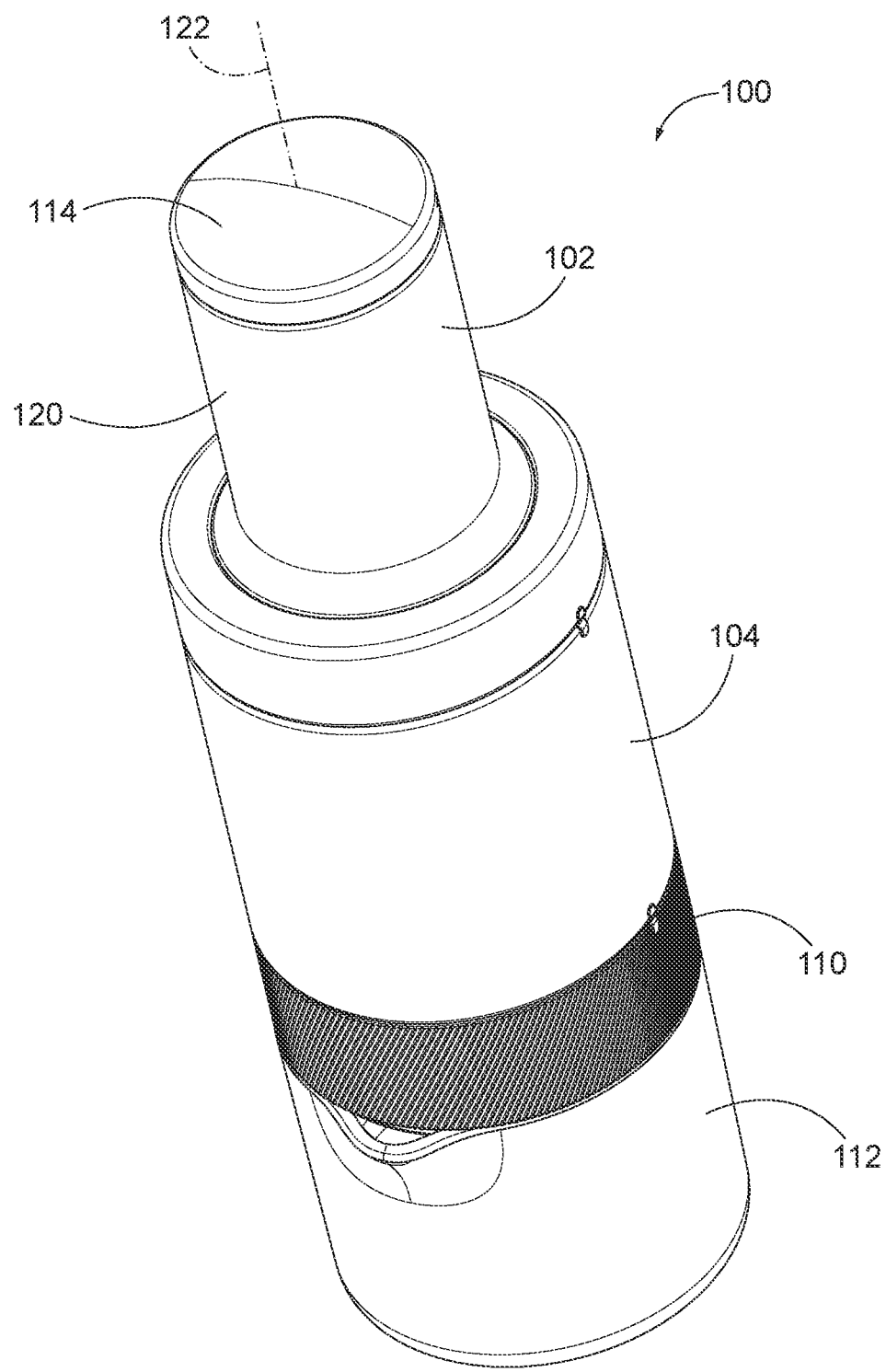
FIG. 1 is a front perspective view of a handheld filter press.

The description and drawings herein are merely illustrative and various modifications and changes can be made in the structures disclosed without departing from the present disclosure. Referring now to the drawings, where like numerals refer to like parts throughout the several views, FIG. 1 depicts a handheld filter press 100 configured for producing a brewed beverage with water and grounds stored therein. The filter press 100 includes a pump 102, a water chamber 104, a portafilter basket 110, and a vessel 112, where actuating the pump 102 pressurizes the water chamber 104 and the portafilter basket 110, and drives the brewed beverage into the vessel 112.

The pump 102 includes a handle 114 and a pump housing 120. The handle 114 is configured for being gripped and driven by a user relative to the pump housing 120 along a pump axis 122, actuating the pump 102. The filter press 100 has a substantially cylindrical profile extended along the pump axis 122, where the handle 114, the pump housing 120, the water chamber 104, and the portafilter basket 110 each have a rounded profile taken along the pump axis 122. The rounded profiles of the handle 114, the pump housing 120, the water chamber 104, and the portafilter basket 110 are coaxial with each other along the pump axis 122.

With this construction, the pump 102, the water chamber 104, the portafilter basket 110, and the vessel 112 are shaped for being gripped by a user as part of the handheld filter press 100. While, as depicted, the pump 102, the water chamber 104, the portafilter basket 110, and the vessel 112 are cylindrical along the pump axis 122 and coaxial with each other, any or all of the pump 102, the water chamber 104, the portafilter 110, and the vessel 112 may be otherwise rounded or shaped for being gripped by a user as part of the handheld filter press 100 without departing from the scope of the present disclosure.

Figure 2:
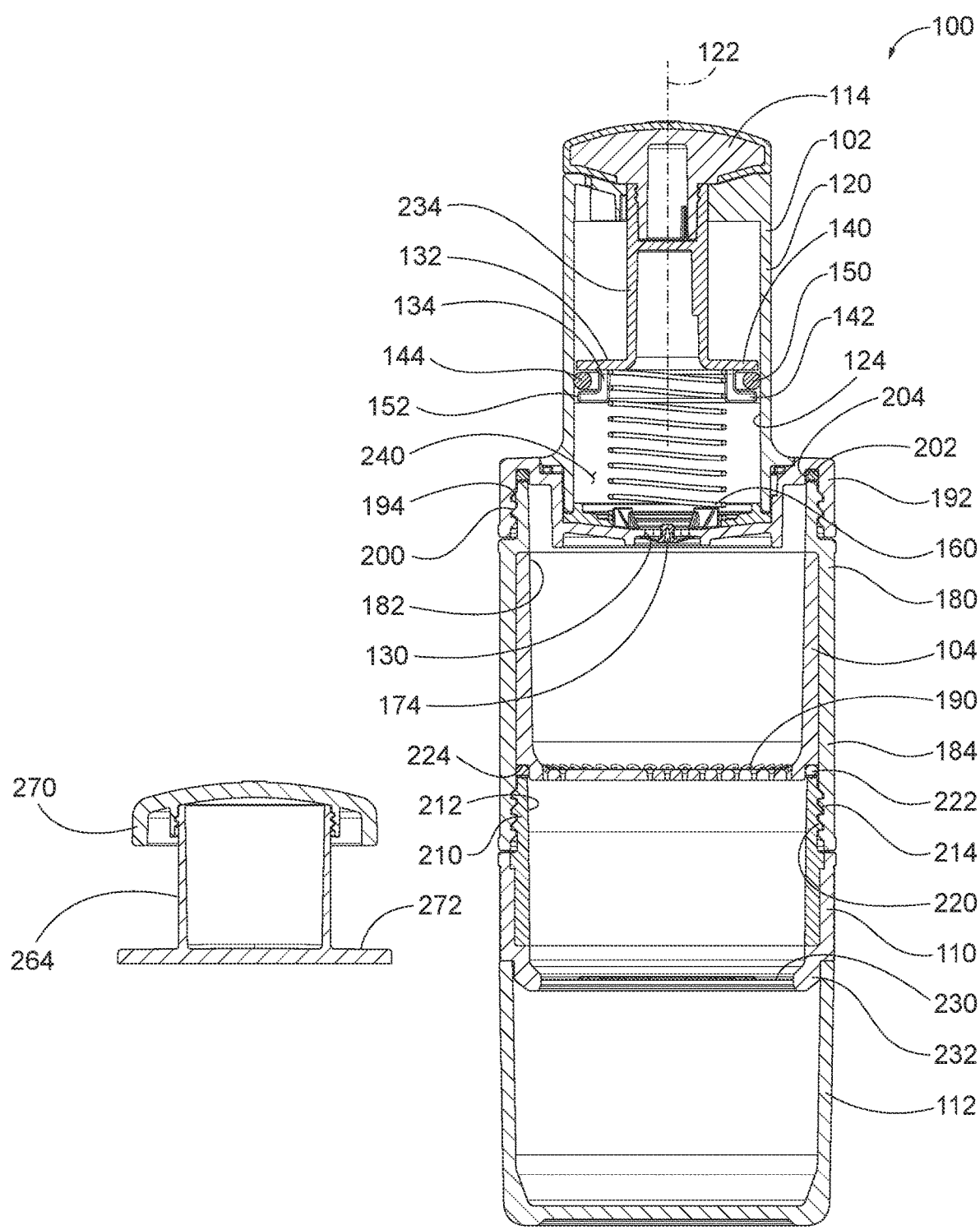
FIG. 2 is a cross-sectional front view of the filter press.

As shown in FIG. 2, the pump housing 120 defines a pump chamber 124 extended along the pump axis 122 and configured to pressurize air. The pump housing 120 also defines a pump outlet 130 for exhausting pressurized air from the pump chamber 124.

The pump 102 includes a piston 132 disposed in the pump chamber 124 and configured to move along the pump axis 122 relative to the pump housing 120 between an extended position (see FIG. 3) and a retracted position (see FIG. 2). The piston 132 includes a cylindrical piston body 134 with a first groove wall 140 and a second groove wall 142 extending outward from the piston body 134, and toward the pump housing 120 in a radial direction of the piston 132 perpendicular to the pump axis 122. The first groove wall 140 is disposed continuously around the piston 132 along an outer perimeter of the piston body 134, in a circumferential direction of the piston 132 perpendicular to the pump axis 122 and the radial direction of the piston 132.

The second groove wall 142 is disposed around the piston body 134 along the outer perimeter of the piston body 134 in the circumferential direction of the piston 132. The second groove wall 142 is offset from the first groove wall 140 along the pump axis 122 to define a groove 144 in the piston 132 with the first groove wall 140 along the piston body 134 in the circumferential direction of the piston 132. The second groove wall 142 is located closer to the pump outlet 130 as compared to the first groove wall 140.

The pump 102 includes a pump gasket 150 that is an O-ring disposed in the groove 144. The pump gasket 150 is configured to seal the pump housing 120 with the piston 132 in the pump chamber 124 along the first groove wall 140 when the piston 132 moves from the extended position to the retracted position. With this construction, the piston 132 and the pump gasket 150 are configured to compress a volume of air in the pump chamber 124 between the piston 132 and the pump outlet 130, thereby pressurizing the pump chamber 124. In this manner, the piston 132 and the pump gasket 150 pressurize the volume of air in the pump chamber 124 in moving from the retracted position to the extended position, driving pressurized air through the pump outlet 130.

The outer perimeter of the piston body 134, an outer perimeter of the first groove wall 140, and an outer perimeter of the second groove wall 142 form a piston side wall 152. The groove 144 is defined in the piston side wall 152, around the piston 132 and along the outer perimeter of the piston body 134 in the circumferential direction of the piston 132.

Figure 3:
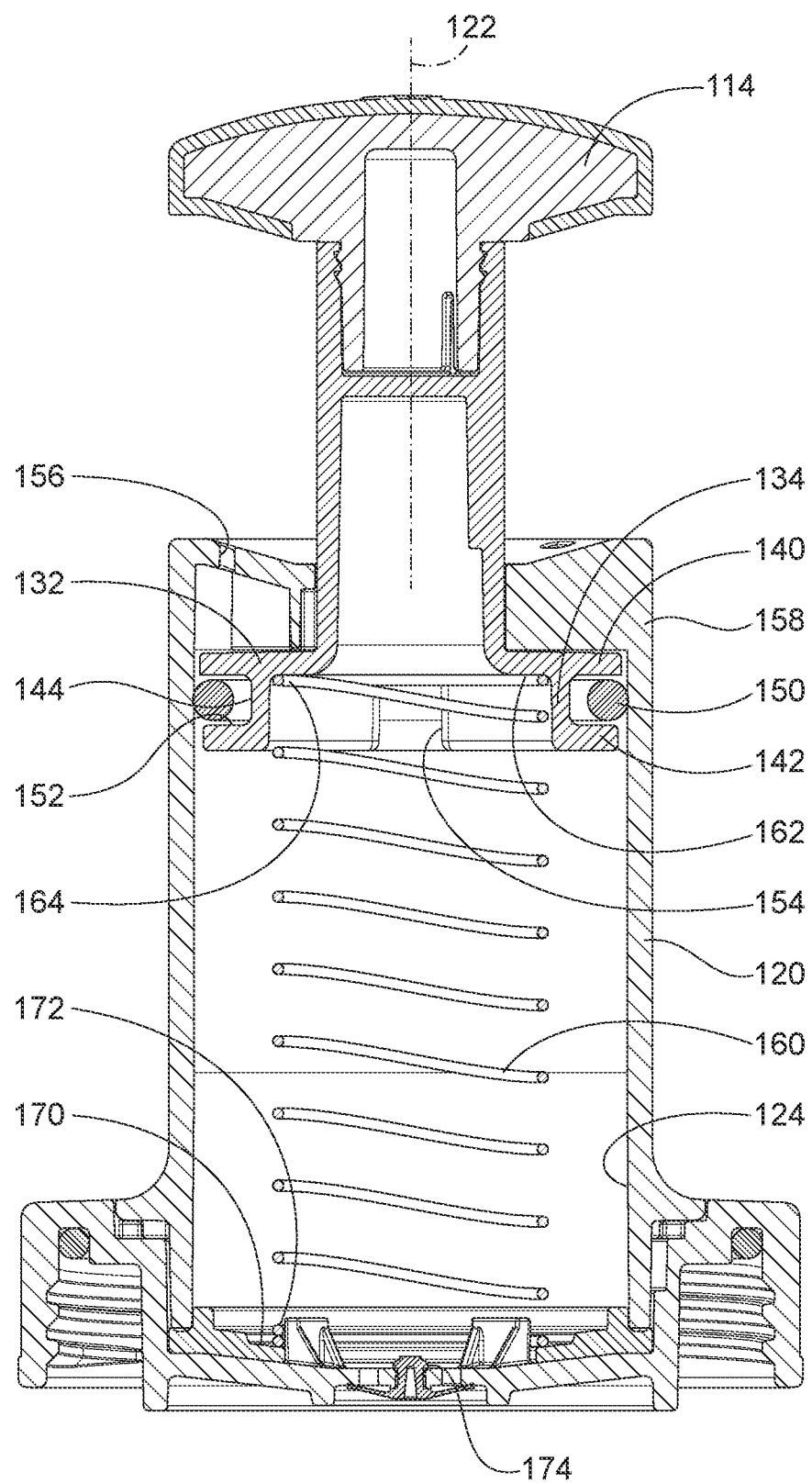
FIG. 3 is a partial cross-sectional side view of the filter press.

As shown in FIG. 3, the piston body 134 and the second groove wall 142 define a channel 154 in the piston side wall 152 along the pump axis 122 from the groove 144 to the pump chamber 124. The pump gasket 150 is spaced from the piston 132 across the channel 154 such that the piston 132 does not form a seal with the pump housing 120 at the channel 154 when the piston 132 moves from the retracted position toward the extended position.

In this manner, the channel 154 is configured to communicate air through the pump housing 120, across the piston 132 and the pump gasket 150, and into the pump chamber 124 when the piston 132 moves from the retracted position to the extended position. As such, the piston 132 and the pump gasket 150 are sealed against the pump housing 120 to pressurize air in the pump chamber 124 when the piston 132 is moved from the extended position toward the retracted position, and the piston 132 draws air into the pump chamber 124 when the piston 132 is moved from the retracted position toward the extended position. With this construction, the piston 132 and the pump gasket 150 form a one-way inlet valve to the pump chamber 124 configured to allow ambient air to pass into the pump chamber 124 when the piston 132 moves from the retracted position to the extended position.

The pump housing 120 defines at least one pump housing inlet 156 that is a through hole opening configured to allow ambient air to into the pump housing 120. The pump housing inlet 156 is located in an upper end portion 158 of the pump housing 120 such that the pump housing inlet 156 is located at a side of the piston 132 opposite the pump outlet 130, including when the piston 132 is located at or between the extended position and the retracted position. As such, the piston 132 draws ambient air into the pump housing 120 through the pump housing inlet 156 when the piston 132 moves from the extended position to the retracted position.

The pump housing inlet 156 is an air inlet to the pump chamber 120 configured to allow ambient air into the pump chamber 120 when the piston 132 moves from the extended position to the retracted position.

The pump 102 further includes a spring 160 fixed with the pump housing 120 and the piston 132. The spring 160 biases the piston 132 from the retracted position toward the extended position.

The piston 132 forms a first spring seat 162 around the pump axis 122 in the circumferential direction of the piston 132. The spring 160 includes a first spring end 164 disposed on the first spring seat 162, fixing the spring 160 with the piston 132.

The pump housing 120 forms a second spring seat 170 around the pump outlet 130 and the pump axis 122 in the circumferential direction of the piston 132. The second spring seat 170 is located across the pump chamber 124 from the first spring seat 162. The spring 160 includes a second spring end 172 disposed on the second spring seat 170, fixing the spring 160 with the piston 132.

Referring back to FIG. 2, the pump 102 includes an outlet valve 174 fluidly connected with the pump outlet 130. The outlet valve 174 is a one-way outlet valve from the pump chamber 124 that allows air to exit the pump chamber 124 and prevents air from entering the pump chamber 124 through the pump outlet 130.

The water chamber 104 is fluidly connected with the pump chamber 124 through the outlet valve 174, and sealed with the pump housing 120 around the pump outlet 130 for receiving pressurized air from the pump chamber 124. The water chamber 104 includes an upper end portion 180 that defines a water chamber inlet 182 for receiving pressurized air from the pump chamber 124. The water chamber 104 also includes a lower end portion 184 that defines a water chamber outlet 190 for exhausting pressurized air and water from the water chamber 104.

The pump housing 120 includes a lower end portion 192 that defines the pump outlet 130. The lower end portion 192 of the pump housing 120 and the upper end portion 180 of the water chamber 104 have complementary threads 194, 200 for removably fixing the pump housing 120 and the water chamber 104 by thread engagement.

The filter press 100 includes a first water chamber gasket 202 sealing the water chamber 104 with the pump housing 120, around the outlet valve 174 when the water chamber 104 is removably fixed with the pump housing 120. The first water chamber gasket 202 is disposed on a first gasket seat 204 formed from the lower end portion 192 of the pump housing 120. When the lower end portion 192 of the pump housing 120 is removably fixed with the upper end portion 180 of the water chamber 104, the first water chamber gasket 202 is pressed into the first gasket seat 204 between the pump housing 120 and the water chamber 104, sealing the water chamber 104 with the pump housing 120.

The portafilter basket 110 includes an upper end portion 210 that defines a portafilter inlet 212 fluidly connected with the water chamber 104 for receiving pressurized air and water from the water chamber 104, through the water chamber outlet 190. The upper end portion 210 of the portafilter basket 110 and the lower end portion 184 of the water chamber 104 have complementary threads 214, 220 for removably fixing the pump housing 120 and the water chamber 104 by thread engagement.

The filter press 100 includes a second water chamber gasket 222 sealing the water chamber 104 with the portafilter basket 110, around the water chamber outlet 190 when the water chamber 104 is removably fixed with the portafilter basket 110. The second water chamber gasket 222 is disposed on a second gasket seat 224 formed from the lower end portion 184 of the water chamber 104. When the upper end portion 210 of the portafilter basket 110 is removably fixed with the lower end portion 184 of the water chamber 104, the second water chamber gasket 222 is pressed into the second gasket seat 224 between the portafilter basket 110 and the water chamber 104, sealing the water chamber 104 with the pump housing 120.

FIG. 2 depicts the filter press 100 in a use condition where the pump axis 122 is oriented substantially vertical, such that water pressurized in the water chamber 104 is supplied to the portafilter basket 110 through the portafilter inlet 212 by gravity. The portafilter basket 110 includes a filter 230 at a bottom end portion 232 of the portafilter basket 110. The portafilter basket 110 is configured to store coffee grounds on the filter 230, and to express a brewed beverage through the filter 230 when the portafilter basket 110 is supplied with water in the use condition.

The portafilter basket 110 is removably fixed with the water chamber 104 at an end of the water chamber 104 opposite the pump 102 such that the pump 102, the water chamber 104, and the portafilter basket 110 are aligned with each other on the pump axis 122. In the depicted embodiment, the piston 132, the water chamber 104, and the portafilter basket 110 are each intersected by the pump axis 122.

As such, the water chamber 104 is interposed between and separates the pump 120 and the portafilter basket 110 along the pump axis 122, where the water chamber 104 is arranged above the portafilter basket 110 and below the outlet valve 174 when the filter press 100 is oriented in the use condition. With this construction, when the water chamber 104 is removably fixed and sealed with the pump housing 120 and the portafilter basket 110, the water chamber 104 is configured to store air and water above atmospheric pressure, thereby supplying pressurized water to the portafilter basket 110 by pressure and gravity in the use condition.

The pump 102 is a reciprocating pump configured to positively displace air from the pump chamber 124, through the outlet valve 174, and into the water chamber 104. By positively displacing air into the water chamber 104, the pump 102 increases pressure inside the water chamber 104 with each mechanical cycle of the pump 102 driving the piston from the extended position to the retracted position.

The pump 102 is configured to perform a plurality of consecutive mechanical cycles which positively displace air from the pump chamber 124 into the water chamber 104, collectively pressurizing the water chamber 104. In this manner, each mechanical cycle in the plurality of mechanical cycles produces additional pressure in the water chamber 104 that combines with pressure added from other consecutive mechanical cycles into a total amount of pressure in the water chamber 104 and the portafilter basket 110 to express the brewed beverage.

With continued reference to FIG. 2, the handle 114 is fixed with the piston 132 and configured for being actuated by a user for driving the piston 132 along the pump axis 122 from the extended position toward the retracted position. The pump 102 includes a rod 234 fixing the piston 132 with the handle 114. The handle 114 is fixed with the piston 132 across the rod 234 and configured to drive the piston 132 with the rod 234 from the extended position toward the retracted position. The handle 114, the rod 234, the piston 132, the water chamber 104, and the portafilter basket 110 are arranged in that order on the pump axis 122. With this construction the filter press 100 is configured for transferring a driving force from the handle 114 to the piston 132 through the rod 234 along the pump axis 122, with an ergonomic assembly as a manual handheld device actuated by a user.

The rod 234 extends along the pump axis 122 to define a stroke length of the piston 132 between the extended position and the retracted position. A total length of the rod 234 usable for actuating the piston 132 is shorter than the pump chamber 124 along the pump axis 122. Accordingly, the stroke length is shorter than a length of the pump chamber 124 along the pump axis 122 such that the piston 132 and the pump housing 120 define a dead space 240 (see FIG. 2) in the pump chamber 124 above the pump outlet 130 when the piston 132 is in the retracted position, and the filter press 100 is oriented in the use condition.

In an embodiment, the stroke length of the piston 132 and an overall volume of the pump chamber 124 are proportioned such that the pump 102 has a size and compression ratio sufficient for causing the water chamber 104 to reach a predetermined pressure over a predetermined number of mechanical cycles when the filter press 100 is operated by hand by a user. In a further embodiment, the predetermined pressure is 7-17 bar, and the predetermined number of mechanical cycles is 5-20. In a further embodiment, the predetermined pressure is 9-15 bar.

Figure 4:
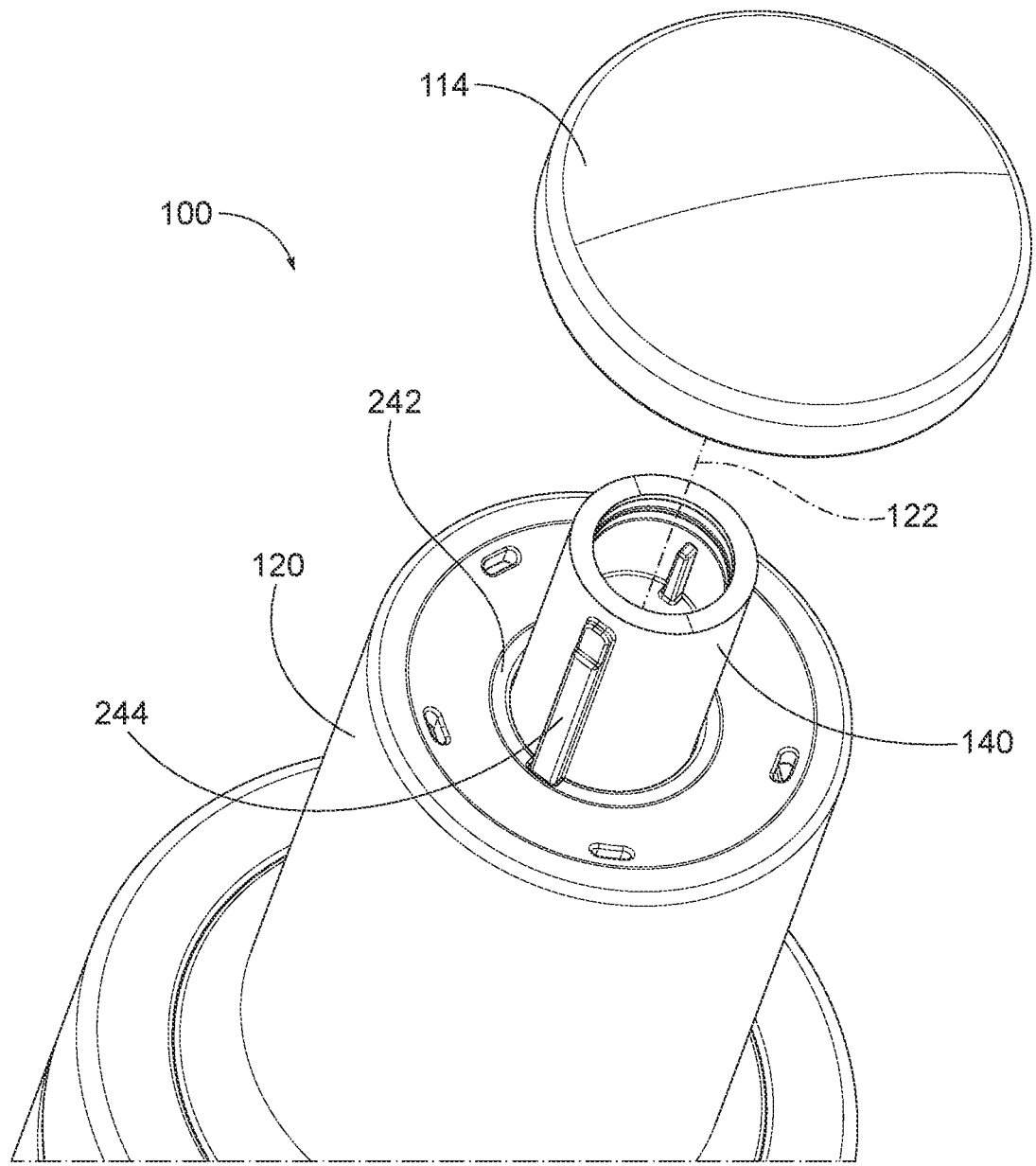
FIG. 4 is an exploded partial top perspective view of the filter press including a pump.

As shown in FIG. 4, the pump housing 120 includes a first protrusion 242, and the rod 234 includes a second protrusion 244. The first protrusion 242 is fixed with the pump housing 120, extends toward the rod 234 from the pump housing 120 in a transverse direction perpendicular to the pump axis 122 and the circumferential direction of the piston 132. The second protrusion 244 is fixed with the rod 234, and extends toward the pump housing 120 from the rod 234 in the transverse direction.

When the piston 132 is in the retracted position, the handle 114, the rod 234, and the piston 132 are configured to twist around the pump axis 122, in the circumferential direction of the piston 132, between a locked position and an unlocked position. When the handle 114, the rod 234, and the piston 132 are rotated to the locked position, the first protrusion 242 obstructs the second protrusion 244 along the pump axis 122 such that the piston 132 is retained in the retracted position. When the handle 114, the rod 234, and the piston 132 are rotated to the unlocked position, the piston 132 is unobstructed from moving from the retracted position toward the extended position, and vice versa.

Figure 5:
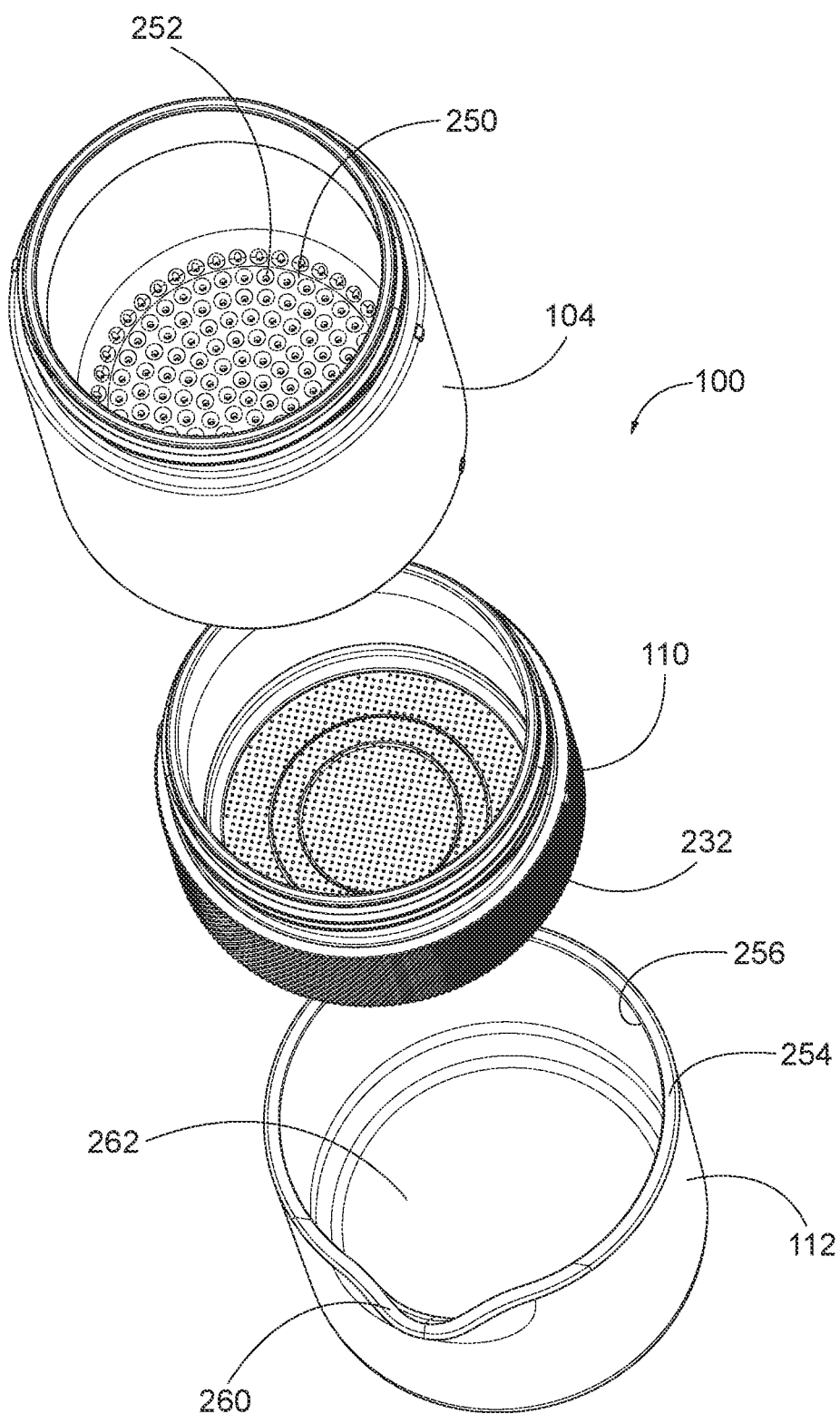
FIG. 5 is an exploded partial top perspective view of the filter press including a water chamber, a portafilter basket, and a vessel.

As shown in FIG. 5, the portafilter basket 110 is arranged above the vessel 112 and below the water chamber 104 when the filter press 100 is oriented in the use condition. The water chamber 104 includes a perforated wall 250 having a plurality of holes 252 that define the water chamber outlet 190. The plurality of holes 252 is configured to restrict water flow from the water chamber 104 to the portafilter basket 110 in a manner that evenly distributes water across the portafilter basket 110 in the transverse direction.

The vessel 112 is a container with a top end portion 254 removably fixed with the lower end portion 232 of the portafilter basket 110 for receiving a brewed beverage through the filter 230 in the portafilter basket 110. The top end portion 254 of the vessel 112 defines a vessel opening 256 configured for receiving and dispensing the brewed beverage.

The top end portion 252 of the vessel 112 defines a spout 260 at the vessel opening 256 for dispensing the brewed beverage from the vessel 112. In an embodiment, when the vessel 112 is removably fixed with the portafilter 110, the spout 260 extends outward from the portafilter basket 110 in the transverse direction and is separated from the portafilter basket 110 such that the spout 260 is capable of dispensing the brewed beverage without the vessel 112 being removed from the portafilter basket 110.

The vessel 112 has a bottom 262 that is substantially flat and extended in the transverse direction. With this construction, the filter press 100 may be placed with the bottom 262 on a substantially flat, horizontal surface, oriented in the use condition, and actuated by a user.

In a method of operating the filter press 100 for producing a brewed beverage, the portafilter basket 110 is oriented substantially in the use condition for storing coffee grounds on the filter 230, and filled with coffee grounds sufficient for brewing the beverage. The method includes compressing the coffee grounds against the filter 230 using a tamp 264 depicted in FIG. 2.

As shown in FIG. 2, the tamp 264 includes a tamp handle 270 fixed with a tamp piston 272. The tamp handle 270 is configured for being gripped by a user, and the tamp piston 272 is configured for being driven into the portafilter basket 110 by the user, from the tamp handle 270, to compress the coffee grounds against the filter 230. The tamp 264 has an overall height and width that fits within the portafilter basket 110, including when the portafilter basket 110 is removably fixed with the water chamber 104. With this construction, the tamp 264 is configured for storage in the portafilter basket 110 when the filter press 100 is not being used to produce a brewed beverage. While, as depicted, the tamp 264 is configured for storage in the portafilter basket 110, the tamp 264 may additionally or alternatively be sized to fit within at least one of the water chamber 104 and the vessel 112 without departing from the scope of the present disclosure.

The method also includes removably fixing the portafilter basket 110 with the vessel 112 substantially in the use condition for retaining the coffee grounds in the portafilter basket 110. The method also includes removably fixing the portafilter basket 110 with the water chamber 104 substantially in the use condition, sealing the water chamber 104 with the portafilter basket 110. The method also includes maintaining the water chamber 104, the portafilter basket 110, and the vessel 112 substantially in the use condition and filling the water chamber 104 and the portafilter basket 110 with an amount of water sufficient in quantity and temperature for producing the brewed beverage.

The method also includes removably fixing the pump 102 with the water chamber 104 substantially in the use condition for retaining the water in the water chamber 104, sealing the water chamber 104 with the pump 102 such that the water chamber 104 is configured to store the water and air from the pump 102 above atmospheric pressure. The method also includes actuating the pump 102 through a plurality of mechanical cycles with the filter press 100 in the use condition to pressurize the water chamber 104, driving the water through the coffee grounds in the portafilter basket 110, and causing the portafilter basket 110 to express a brewed beverage through the filter 230 into the vessel 112.

The described method for producing a brewed beverage using the filter press 100 may be executed to produce a variety of brewed beverages. For example, a ratio of the water and the coffee grounds, the temperature of the water, a grind size and a bean type of the coffee grounds, and an amount of pressure applied to the water and the coffee grounds in the filter press 100 may be adjusted to produce a variety of infused, espresso, and other styles of coffee beverages. Also, the water provided in the filter press 100 may be hot or cold, such that the method produces a hot or cold coffee beverage. Further, the coffee grounds may additionally include, or be substituted for tea leaves, botanicals, or other brewing ingredients for producing a variety of brewed beverages with the filter press 100 without departing from the scope of the present disclosure.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A handheld filter press comprising:
a pump including:
   a pump housing that defines a pump chamber configured to pressurize air, and defines a pump outlet for exhausting pressurized air from the pump chamber;
   an outlet valve fluidly connected with the pump outlet, wherein the outlet valve allows air to exit the pump chamber and prevents air from entering the pump chamber through the pump outlet;
a water chamber fluidly connected with the pump chamber through the outlet valve for receiving pressurized air from the pump chamber, wherein the water chamber defines a water chamber outlet for exhausting pressurized air and water from the water chamber; and
a portafilter basket fluidly connected with the water chamber for receiving pressurized water from the water chamber through the water chamber outlet, wherein the portafilter basket is configured to store grounds, and to express a brewed beverage;
wherein the pump further includes a piston disposed in the pump chamber and configured for moving along a pump axis relative to the pump housing between an extended position and a retracted position,
wherein the piston pressurizes air in the pump chamber and drives air from the pump chamber through the outlet valve when the piston is moved from the extended position toward the retracted position, and the piston draws air into the pump chamber when the piston is moved from the retracted position toward the extended position,
wherein the pump further includes a handle fixed with the piston and configured for driving the piston from the extended position toward the retracted position, and
wherein when the piston is in the retracted position along the pump axis, the handle is configured to twist around the pump axis between a locked position and an unlocked position, wherein the piston is retained in the retracted position along the pump axis when the handle is rotated to the locked position, and the piston is unobstructed from moving toward the extended position when the handle is rotated to the unlocked position.

2. The handheld filter press of claim 1, wherein the pump is a reciprocating pump configured to positively displace air from the pump chamber, through the outlet valve, into the water chamber.

3. The handheld filter press of claim 2,
wherein the pump further includes a rod fixing the piston with the handle, the rod extends along the pump axis to define a stroke length of the piston between the extended position and the retracted position, and the stroke length is shorter than a length of the pump chamber along the pump axis such that the piston and the pump housing define a dead space in the pump chamber above the pump outlet when the piston is in the retracted position, and the handheld filter press is oriented in a use condition.

4. The handheld filter press of claim 1, wherein the pump further includes:
a rod fixing the piston with the handle, wherein the handle is configured to drive the piston with the rod;
a first protrusion fixed with the pump housing, wherein the first protrusion extends toward the rod from the pump housing in a transverse direction perpendicular to the pump axis; and a second protrusion fixed with the rod, wherein the second protrusion extends toward the pump housing from the rod in the transverse direction, wherein when the piston is in the retracted position, the handle is configured to twist around the pump axis between a locked position and an unlocked position, wherein when the handle is rotated to the locked position, the first protrusion obstructs the second protrusion along the pump axis such that the piston is retained in the retracted position, and wherein when the handle is rotated to the unlocked position, the piston is unobstructed from moving toward the extended position.

5. The handheld filter press of claim 1, wherein the pump further includes:

a first groove wall disposed continuously around the piston along an outer perimeter of the piston, in a circumferential direction perpendicular to the pump axis;

a second groove wall disposed around the piston along the outer perimeter of the piston in the circumferential direction, and offset from the first groove wall along the pump axis to define a groove in the piston with the first groove wall, wherein the second groove wall is located closer to the pump outlet as compared to the first groove wall, wherein the second groove wall defines a channel extending from the groove to the pump chamber; and a pump gasket disposed in the groove, configured to seal the pump housing with the piston in the pump chamber along the first groove wall when the piston moves from the extended position to the retracted position, and configured to allow air to pass through the channel, into the pump chamber when the piston moves from the retracted position to the extended position.

6. The handheld filter press of claim 1, wherein the piston pressurizes air in the pump chamber and drives air from the pump chamber through the outlet valve when the piston is moved from the extended position toward the retracted position, and the piston draws air into the pump chamber when the piston is moved from the retracted position toward the extended position, and wherein the pump further includes a spring fixed with the pump housing and the piston, wherein the spring biases the piston from the retracted position toward the extended position.

7. The handheld filter press of claim 1, wherein the water chamber is removably fixed with the pump housing, and when fixed with the pump housing, configured to store air and water above atmospheric pressure, and wherein the portafilter basket is removably fixed with the water chamber at an end of the water chamber opposite the pump.

8. The handheld filter press of claim 7, the water chamber is arranged above the portafilter basket and below the outlet valve when the handheld filter press is oriented in a use condition.

9. The handheld filter press of claim 8, wherein the piston, the water chamber, and the portafilter basket are each intersected by the pump axis.

10. The handheld filter press of claim 7, further comprising:

a first water chamber gasket sealing the water chamber with the pump housing, around the outlet valve, when the water chamber is fixed with the pump housing; and a second water chamber gasket sealing the water chamber with the portafilter basket, around the water chamber outlet, when the water chamber is fixed with the portafilter basket.

11. A handheld filter press comprising:

a pump including a pump housing, wherein the pump housing defines a pump chamber extended along a pump axis and configured to pressurize air, and the pump housing defines a pump outlet for exhausting pressurized air from the pump chamber;

a water chamber removably fixed with the pump housing, wherein the water chamber is fluidly connected with the pump chamber through the pump outlet, and configured to store air and water above atmospheric pressure when fixed with the pump housing;

a portafilter basket removably fixed with the water chamber at an end of the water chamber opposite the pump such that the pump, the water chamber, and the portafilter basket are aligned with each other on the pump axis, wherein the portafilter basket is fluidly connected with the water chamber, configured to store grounds, and configured to express a brewed beverage;

a first water chamber gasket sealing the water chamber with the pump housing, around the pump outlet, when the water chamber is fixed with the pump housing; and a second water chamber gasket sealing the water chamber with the portafilter basket when the water chamber is fixed with the portafilter basket.

12. The handheld filter press of claim 11, wherein the pump, the water chamber, and the portafilter basket are aligned with each other on the pump axis.

13. The handheld filter press of claim 11, wherein the pump housing, the water chamber, and the portafilter basket each have a rounded profile taken along the pump axis, wherein the rounded profiles of the pump housing, the water chamber, and the portafilter basket are coaxial with each other along the pump axis.

14. The handheld filter press of claim 11, wherein the pump further includes:

an outlet valve fluidly connected with the pump outlet such that the water chamber is fluidly connected with the pump chamber through the outlet valve, wherein the outlet valve allows air to exit the pump chamber and prevents air from entering the pump chamber through the pump outlet; and a piston disposed in the pump chamber and configured for moving along a pump axis relative to the pump housing between an extended position and a retracted position, wherein the piston pressurizes air in the pump chamber and drives air from the pump chamber through the outlet valve when the piston is moved from the extended position toward the retracted position, and the piston draws air into the pump chamber when the piston is moved from the retracted position toward the extended position.

15. The handheld filter press of claim 14, wherein the pump further includes a handle fixed with the piston across a rod, the handle being configured for driving the piston with the rod from the extended position toward the retracted position, wherein the handle, the rod, the piston, the water chamber, and the portafilter basket are arranged in that order on the pump axis.

16. The handheld filter press of claim 11, wherein the pump further includes:

a piston disposed in the pump chamber and configured for moving along a pump axis relative to the pump housing between an extended position and a retracted position, wherein the piston defines a groove in a piston side wall, around the piston along an outer perimeter of the piston, in a circumferential direction perpendicular to the pump axis, and the piston defines a channel from the groove to the pump chamber; and a pump gasket disposed in the groove and configured to seal the pump housing with the piston in the pump chamber when the piston moves from the extended position to the retracted position, thereby pressurizing the pump chamber, wherein the piston defines a channel in the piston side wall from the groove to the pump chamber, wherein the channel is configured to communicate air across the piston from around the pump gasket when the piston moves from the retracted position to the extended position.

17. The handheld filter press of claim 11, wherein the pump is a reciprocating pump configured to perform a plurality of consecutive mechanical cycles which positively displace air from the pump chamber into the water chamber, pressurizing the water chamber, wherein each mechanical cycle in the plurality of mechanical cycles produces additional pressure in the water chamber that combines with pressure added from other consecutive mechanical cycles into a total amount of pressure in the water chamber to express the brewed beverage.

18. The handheld filter press of claim 11, wherein the water chamber is interposed between and separates the pump and the portafilter basket along the pump axis.

19. A handheld filter press comprising:

a pump including a pump housing, wherein the pump housing defines a pump chamber extended along a pump axis and configured to pressurize air, and the pump housing defines a pump outlet for exhausting pressurized air from the pump chamber;

a water chamber removably fixed with the pump housing, wherein the water chamber is fluidly connected with the pump chamber through the pump outlet, and configured to store air and water above atmospheric pressure when fixed with the pump housing; and a portafilter basket removably fixed with the water chamber at an end of the water chamber opposite the pump such that the pump, the water chamber, and the portafilter basket are aligned with each other on the pump axis, wherein the portafilter basket is fluidly connected with the water chamber, configured to store grounds, and configured to express a brewed beverage;

wherein the pump further includes:

a piston disposed in the pump chamber and configured for moving along a pump axis relative to the pump housing between an extended position and a retracted position, wherein the piston defines a groove in a piston side wall, around the piston along an outer perimeter of the piston, in a circumferential direction perpendicular to the pump axis, and the piston defines a channel from the groove to the pump chamber; and a pump gasket disposed in the groove and configured to seal the pump housing with the piston in the pump chamber when the piston moves from the extended position to the retracted position, thereby pressurizing the pump chamber, wherein the piston defines a channel in the piston side wall from the groove to the pump chamber, wherein the channel is configured to communicate air across the piston from around the pump gasket when the piston moves from the retracted position to the extended position.

20. The handheld filter press of claim 19, wherein the pump further includes a handle fixed with the piston and configured for driving the piston from the extended position toward the retracted position, and wherein when the piston is in the retracted position along the pump axis, the handle is configured to twist around the pump axis between a locked position and an unlocked position, wherein the piston is retained in the retracted position along the pump axis when the handle is rotated to the locked position, and the piston is unobstructed from moving toward the extended position when the handle is rotated to the unlocked position.

* * * * *